(No Model.)

N. R. RODGERS.
COTTON PLANTER.

No. 372,488. Patented Nov. 1, 1887.

WITNESSES:
Phil C. Dietrich
C. Sedgwick

INVENTOR:
N. R. Rodgers
BY Munn & Co
ATTORNEYS.

UNITED STATES PATENT OFFICE.

NATHANIEL R. RODGERS, OF RED FORK, ARKANSAS.

COTTON-PLANTER.

SPECIFICATION forming part of Letters Patent No. 372,488, dated November 1, 1887.

Application filed August 27, 1887. Serial No. 248,031. (No model.)

*To all whom it may concern:*

Be it known that I, NATHANIEL R. RODGERS, of Red Fork, in the county of Desha and State of Arkansas, have invented a new and Improved Cotton-Planter, of which the following is a full, clear, and exact description.

My invention relates to an improvement in cotton-planters; and it has for its object to provide a machine which will pulverize the ground, make the furrow, plant the seed at regular intervals, and cover the same, and wherein the machine may be built in a simple and economical manner, and be accurate and effective in operation.

The invention consists in the construction and operation of the several parts, as will be hereinafter fully set forth, and pointed out in the claims.

Reference is to be had to the accompanying drawings, forming a part of this specification, in which similar letters of reference indicate corresponding parts in all the figures.

Figure 1:
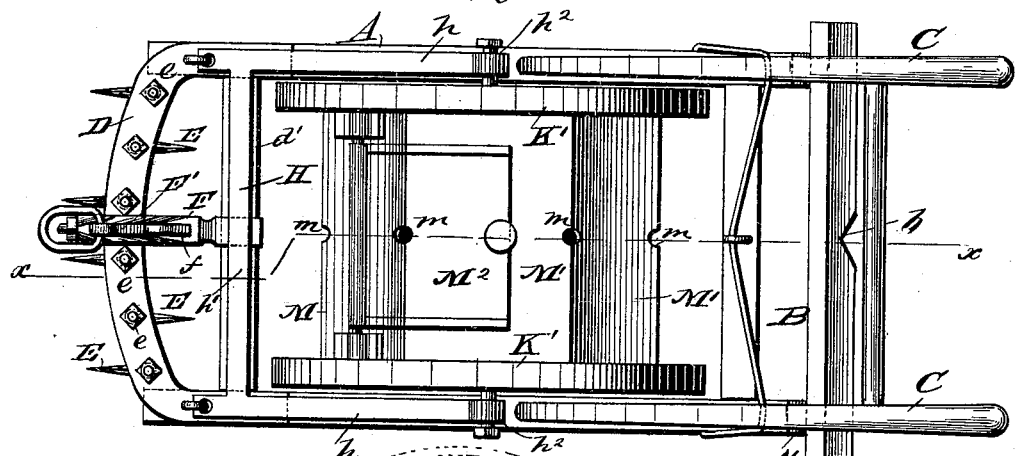
Figure 2:
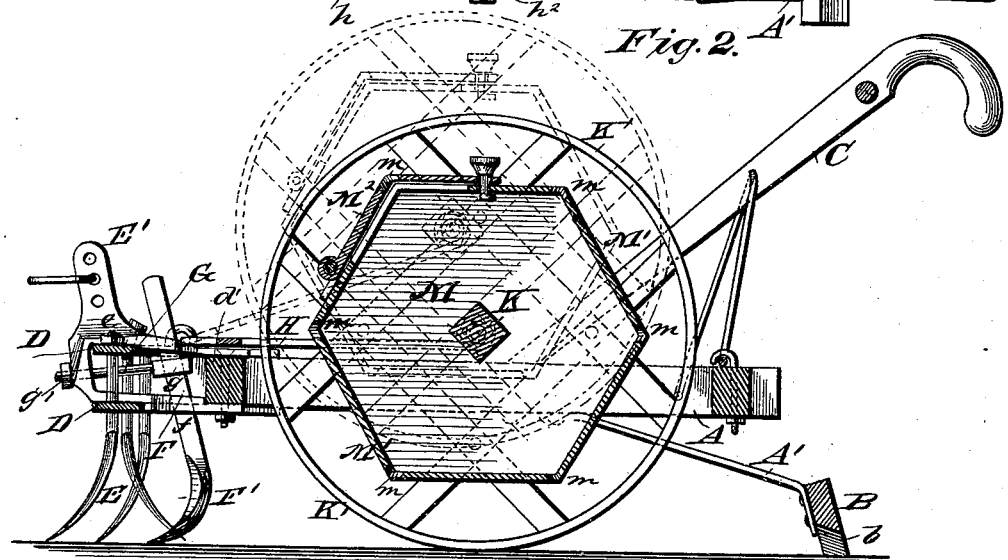
Figure 3:
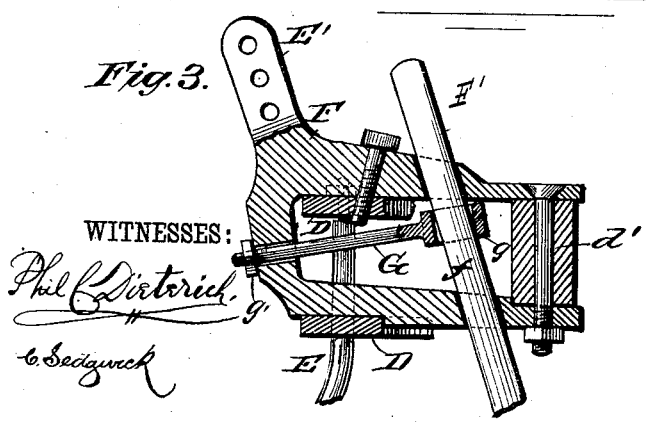
Figure 4:
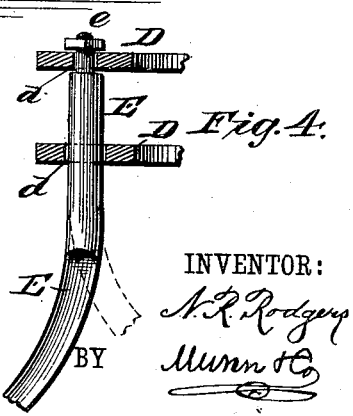

Figure 1 is a plan view of the machine, and Fig. 2 is a central vertical longitudinal section on line $x$ $x$ of Fig. 1. Fig. 3 is a detail sectional view of the plow adjustment, and Fig. 4 is a detail sectional view of one tooth and the plate in which the teeth are held.

In carrying out the invention, a rectangular frame, A, is constructed, provided at the rear end, upon the under face at each side, with rearwardly-extending spring-plates A', the free ends of which are secured to a transverse covering-board, B, having a V-shaped slot, $b$, cut centrally in its bottom edge. To the upper edge of the side pieces of the frame handles C are secured, whereby the machine is guided and managed.

At the front of the frame A, to the upper and lower edges of the side pieces, the ends of parallel apertured segmental plates D are secured, the apertures $d$ in one plate aligning the apertures in the other.

Through each of the aligning apertures $d$ a harrow-tooth, E, is projected, triangular in cross-section below the plate and circular at the top. Each tooth E is adapted to turn freely in the apertures, being held in position by a nut, $e$, screwed upon their reduced and threaded upper ends over the top segmental plate, as shown in Fig. 4.

The clevis E' is made integral with the upper surface of a substantially U-shaped brace-bar, F, the upper member of which brace is attached to the upper surface of the segmental plate D and the transverse front tie-beam $d'$ of the frame, centrally the same, and the remaining member is secured to the upper surface of the lower segmental plate D and to the under edge of the said tie-beam $d'$, as shown in Fig. 3.

Diagonally inward between the plates D and the front beam, $d'$, of the frame, the shank $f$ of a plow, F', is projected through slots cut in the members of the brace, the said plow being sustained in a given position with relation to the ground and rendered vertically adjustable by a rod, G, having an eye, $g$, embracing the plow shank at one end, and an opposing threaded end projected through the U-brace at the front, and secured by a nut, $g'$, as illustrated in Fig. 3. By loosening the nut $g'$ the plow may be adjusted vertically to a nicety, and secured in the desired position by again screwing down the nut $g'$.

An auxiliary metal frame, H, consisting of parallel side bars, $h$, and a connecting-bar, $h'$, is hinged by the ends of the side bars, $h$, to the top segmental plate, D, the said side bars being adapted to extend above and parallel with the side bars of the main frame to about the center thereof; and at the extremities of the side bars, $h$, eyes $h^2$ are formed, in which a transverse shaft, K, is journaled, upon which shaft the drive-wheels K' of the machine are keyed, and between said drive-wheels and upon the axle a seed-carrier, M, having a polygonal face, M', is mounted, provided centrally at the angles of the face with apertures $m$, which apertures align the plow and drop the seed at stated intervals in the furrow made by the latter. The seeds are thus dropped at a distance apart instead of being dropped in a line, as heretofore, whereby the plants may be cultivated without the use of a hoe.

A suitable door, M², is provided the carrier, secured by any approved style of fastening, through which door the seed is entered.

In operation the seed is placed in the carrier, within which various arms or bars may be secured, to break any lumps and agitate the seed, and the door is locked. As the machine is drawn along, the teeth E pulverize the earth, and as the said teeth are free to revolve, any large clods in their path will not throw the machine out of a given line, as the teeth will automatically turn to avoid the same, the sharp edges simultaneously reducing the bulk. The plow F', following, makes a furrow, into which the seed is dropped by the carrier M; and the board B, following, covers the seed, the recess b forming a ridge above the seed to indicate the planted row.

Should the wheels encounter obstructions, they will rise, as shown in dotted lines, Fig. 2, and ride over them, leaving the main frame A perfectly steady, as the two frames, by their hinged connection, operate independently of each other.

Having thus fully described my invention, what I claim as new, and desire to secure by Letters Patent, is—

1. The combination, with a frame having a seed-carrier journaled therein and a plow in advance of said carrier, of parallel spaced plates secured to the forward end of the frame, and a series of curved harrow-teeth held to turn freely in said plates, substantially as shown and described, whereby said teeth will accommodate themselves to the roughness of the ground and yet serve as pulverizers, as set forth.

2. The combination, with a frame carrying revoluble harrow-teeth, a plow, and a covering-board, of an auxiliary frame hinged to the front of the main frame, a shaft journaled in the free ends of said frame between the plow and covering-board, drive-wheels keyed upon the shaft within the main frame, and a seed-carrier secured to said shaft between the drive-wheels, substantially as and for the purpose herein set forth.

3. The combination, with a rectangular frame, parallel segmental plates secured to the forward end of the frame, series of vertical harrow-teeth held to turn freely in said plates, a plow adjustably held centrally at the rear of said teeth, and a covering-board secured by spring-arms to the rear of the frame, of an auxiliary frame hinged to the forward end of the main frame, a shaft journaled in the free end of said frame between the plow and covering-board, drive-wheels keyed upon the shaft, and a seed-carrier secured to said shaft between the wheels, provided with peripheral apertures in alignment with the plow, substantially as shown and described.

4. The combination, with a rectangular frame and parallel segmental plates secured to its forward end, a series of vertical harrow-teeth, triangular in cross-section, held to turn freely in said plates, a plow adjustably supported in a bracket centrally at the rear of the teeth, and a covering-board having a central V-shaped recess in its lower edge, secured to the rear of the frame by spring-arms, of an auxiliary frame hinged to the forward end of the main frame, a shaft journaled in the free end of the said frame between the plow and covering-board, drive-wheels keyed upon the shaft, and a seed-carrier secured to said shaft between the wheels, provided with peripheral apertures in alignment with the plow, substantially as set forth.

NATHANIEL R. RODGERS.

Witnesses:
J. M. KITELEY,
H. A. BUCK.